US010057275B2

(12) United States Patent
Balasubramanian et al.

(10) Patent No.: US 10,057,275 B2
(45) Date of Patent: *Aug. 21, 2018

(54) RESTRICTED CONTENT PUBLISHING WITH SEARCH ENGINE REGISTRY

(71) Applicant: International Business Machines Corporation, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,009

(22) Filed: Jan. 6, 2017

(65) Prior Publication Data

US 2017/0118224 A1 Apr. 27, 2017

Related U.S. Application Data

(63) Continuation of application No. 14/921,361, filed on Oct. 23, 2015, now Pat. No. 9,578,012, which is a (Continued)

(51) Int. Cl.
*H04L 29/06* (2006.01)
*G06F 17/30* (2006.01)
*G06F 21/62* (2013.01)

(52) U.S. Cl.
CPC ...... *H04L 63/105* (2013.01); *G06F 17/30864* (2013.01); *G06F 21/6209* (2013.01); *H04L 63/08* (2013.01)

(58) Field of Classification Search
CPC .......... G06F 17/30864; G06F 21/6209; G06F 21/6218; G06F 2221/2113
See application file for complete search history.

(56) References Cited

U.S. PATENT DOCUMENTS 6,253,198 B1 * 6/2001 Perkins ............... G06F 17/3089
707/711
7,921,360 B1 4/2011 Sundermeyer et al.
(Continued)

FOREIGN PATENT DOCUMENTS

WO 0068839 A1 11/2000

OTHER PUBLICATIONS

Anwar et al., "Attribute Based Access Control in DSpace," 7th International Conference on Computing and Convergence Technology (ICCCT), 2012, p. 571-576, IEEE.
(Continued)

*Primary Examiner* — Harunur Rashid
(74) *Attorney, Agent, or Firm* — Patricia B. Feighan

(57) ABSTRACT

A processor-implemented method is provided. The method may include providing a content registry with at least one application program interface (API) to manage a plurality of entries stored in the content registry. The method may also include providing access to the plurality of entries by a pre-authorized search engine to the content registry in response to a search requested by an authorized requester.

11 Claims, 7 Drawing Sheets

Related U.S. Application Data continuation of application No. 14/664,820, filed on Mar. 21, 2015, now Pat. No. 9,578,006.

(56) References Cited

U.S. PATENT DOCUMENTS

| | | | |
|---|---|---|---|
| 7,962,844 B2 | 6/2011 | Knotz et al. | |
| 8,620,911 B2 | 12/2013 | Simske et al. | |
| 8,650,648 B2 | 2/2014 | Howard et al. | |
| 8,909,669 B2 | 12/2014 | Shelton | |
| 9,578,006 B2 | 2/2017 | Balasubramanian et al. | |
| 9,578,012 B2 | 2/2017 | Balasubramanian et al. | |
| 2005/0055327 A1* | 3/2005 | Agrawal | G06F 17/30699 |
| 2005/0131918 A1 | 6/2005 | Hillis et al. | |
| 2006/0080316 A1* | 4/2006 | Gilmore | G06F 17/30864 |
| 2007/0214129 A1* | 9/2007 | Ture | G06F 17/30864 |
| 2007/0299853 A1 | 12/2007 | Knotz et al. | |
| 2009/0204580 A1 | 8/2009 | Seamon et al. | |
| 2011/0072039 A1 | 3/2011 | Tayloe | |
| 2011/0153599 A1 | 6/2011 | Hillis et al. | |
| 2011/0178868 A1* | 7/2011 | Garg | G06F 17/30864 |
| | | | 705/14.45 |
| 2012/0011167 A1 | 1/2012 | Schmidt | |
| 2012/0117665 A1 | 5/2012 | Borden et al. | |
| 2013/0091232 A1 | 4/2013 | Codignollo | |
| 2013/0145478 A1 | 6/2013 | O'Gorman, Jr. et al. | |
| 2013/0198660 A1 | 8/2013 | Brugler et al. | |
| 2013/0254855 A1 | 9/2013 | Walters et al. | |
| 2016/0277376 A1 | 9/2016 | Balasubramanian et al. | |
| 2016/0277378 A1 | 9/2016 | Balasubramanian et al. | |

OTHER PUBLICATIONS

Chatvichienchai et al., "Bring Precision and Access Control to Business Document Search," Ninth ACIS International Conference on Software Engineering, Artificial Intelligence, Networking, and Parallel/Distributed Computing, 2008, p. 557-562, IEEE.

Google, "About rich snippets and structured data," Google Webmaster Tools Help, p. 1-4, https://support.google.com/webmasters/answer/99170?hl=en, Accessed on Jan. 27, 2015.

Google, "Google AdWords," Google (PPC) Pay-Per-Click Online Advertising, p. 1-3, https://www.google.com/adwords/, Accessed on Mar. 18, 2015.

Google, "How Search Works—The Story," Google Inside Search, p. 1-8, http://www.google.co.za/insidesearch/howsearchworks/thestory/, Accessed on Mar. 16, 2015.

Mell et al., "The NIST Definition of Cloud Computing," National Institute of Standards and Technology, Information Technology Laboratory, Oct. 7, 2009, Version 15.

Moore et al, "Automated Validation of Trusted Digital Repository Assessment Criteria," Journal of Digital Information, 2007, 8 Pages, vol. 8, No. 2.

Nowak et al., "Content Registry—the distributed database of content localization for the PI CAN network," XVth International Telecommunications Network Strategy and Planning Symposium (NETWORKS), 2012, IEEE.

Search Engine Watch, "Submitting to Search Crawlers: Google, Yahoo, Ask & Microsoft's Live Search," Search Engine Watch News, Mar. 11, 2007, p. 1-3, Part 4 of Essentials of Search Engine Submission, http://searchenginewatch.com/sew/news/2064310/submitting-to-search-crawlers-google-yahoo-ask-microsofts-live-search, Accessed on Mar. 18, 2015.

Sherman, "Yahoo Announces Content Acquisition Program," Search Engine Watch News, Mar 1, 2004, p. 1-7, http://searchenginewatch.com/sew/news/2048183/yahoo-announces-content-acquisition-program, Accessed on Mar. 18, 2015.

IBM, "List of IBM Patents or Patent Applications Treated as Related (Appendix P)," Mar. 12, 2018, p. 1-2.

* cited by examiner

RESTRICTED CONTENT PUBLISHING WITH SEARCH ENGINE REGISTRY

BACKGROUND

The present invention relates generally to the field of computers, and more particularly to search engines.

Search engines (SEs), such as Google (Google® and all Google®—based trademarks and logos are trademarks of Google and/or its affiliates) or Yahoo® (Yahoo® and all Yahoo®—based trademarks and logos are trademarks of Yahoo! Inc. and/or its affiliates) typically use several techniques to crawl or index web pages. Such techniques basically follow links on pages to other pages. Then the pages are sorted by content (and other factors) and this information is indexed. Algorithms and ranking is then used to deliver the best results for search queries. Some SEs such as Google® also enable content owners to use Rich snippets (e.g., microdata, microformats, RDFa, and Data Highlighter) which are the few lines of text that appear under every search result and are designed to give users a sense for what is on the web page and why it's relevant to their query.

SUMMARY

In one aspect of the present invention, a method, a computer program product, and a system includes: providing, by a processor, an online content registry with at least one application program interface (API) to manage a plurality of online entries stored in the online content registry, wherein the API includes: storing online entries in the online content registry, wherein the stored online entries include: metadata associated with online content restricted to access by an authorized requester, the metadata including a description of the online content; web links to the online content; and the authorized requester is identified by the pre-authorized search engine through use of a decentralized authentication; pushing the stored online entries to a plurality of indexing solutions associated with a pre-authorized external search engine, wherein the pushed online entries comprise access to the metadata and the web links, and the pre-authorized external search engine is determined by an agreement between a content provider and a search engine provider; detecting at least one change associated with the pushed online entries; and automatically sending to the pre-authorized external search engine a notification of the at least one change; and providing, by the pre-authorized external search engine, access to the stored online entries to the online content registry responsive to an online search request received from the authorized requester; and a set of relevant material stored in the online content registry matching the online search request. The matching is based on user data, tags, keywords, and the metadata associated with online entries stored within the online content registry. Providing access to the stored online entries includes displaying, via a graphical user interface, the web links and the description of the online content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
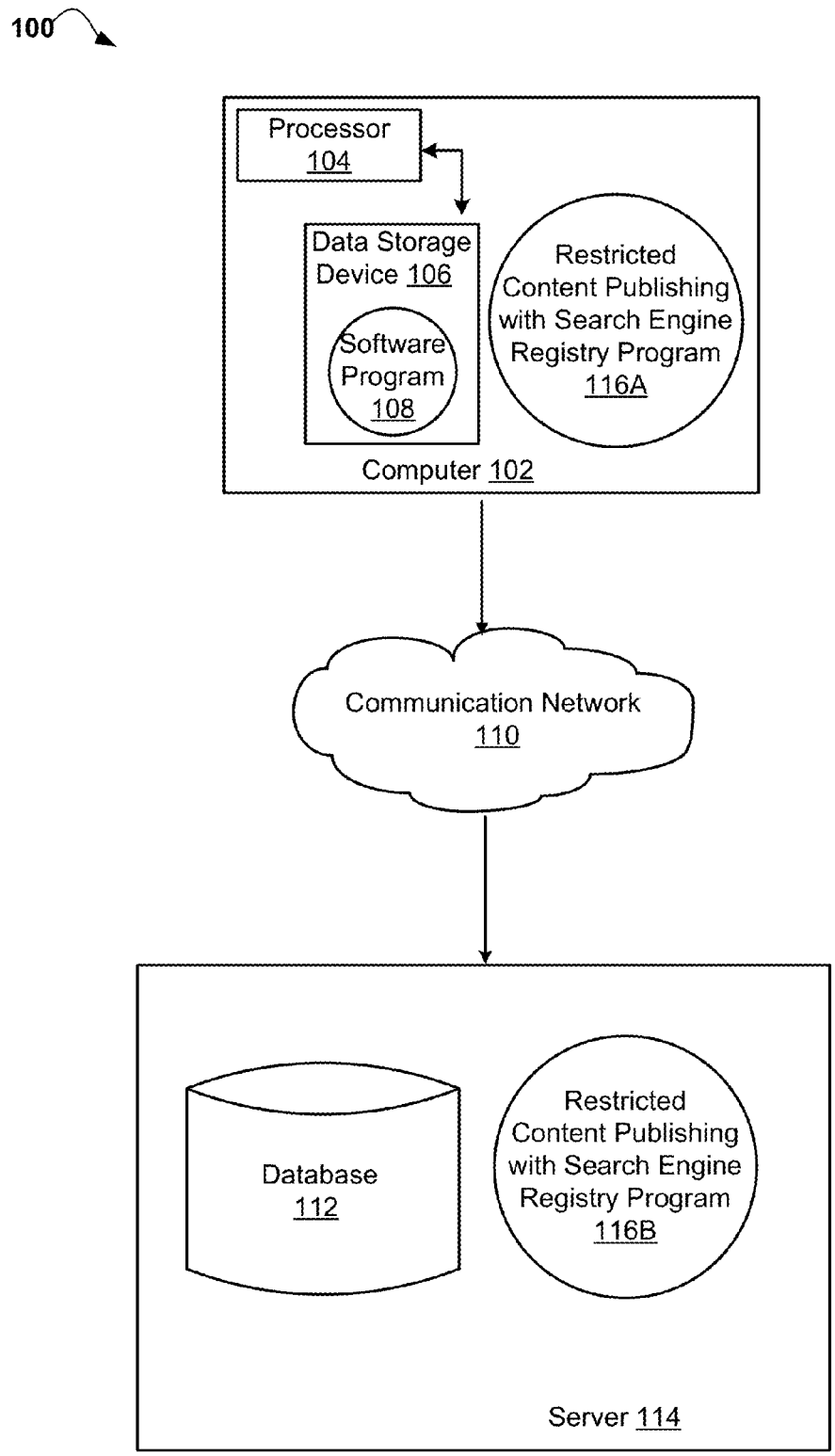
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to search engines. The following described exemplary embodiments provide a system, method and program product to, among other things, publish restricted content (i.e., a content that requires a pre-authorization to access it) with search engine registry. Therefore, the present embodiment has the capacity to improve the technical field of search engines by discovering weblinks where the source of the links is inaccessible to search engines (SEs). More specifically, the present embodiment may enable the content being searched to be visible to the public domain or at targeted requesters (e.g., users) so the SE is enabled to quickly list these links as part of the search results returned to the requester.

As previously described, Search engines (SEs) typically use several techniques to crawl or index web pages. Such techniques basically follow links on pages to other pages. Then the pages are sorted by content (and other factors) and this information is indexed. Algorithms and ranking is then used to deliver the best results for search queries. Some SEs also enable content owners to use Rich snippets which are the few lines of text that appear under every search result and are designed to give users a sense for what is on the web page and why it's relevant to their query.

Today content owners have to expose all relevant links through their public site in order for it to be discovered and indexed by a SE. However, several use cases exist where content owners may want to expose web links to the public domain or at targeted users as part of the search results when certain queries or tags are used. For example, military operations or strategic research initiatives may want to expose links to documents that can be searched and downloaded by partner organizations but not host the content in the public domain. Additionally, there are commercial examples where premium or paid members would want to search for content specifically targeted at their level of membership without having to login to the site in order to manually locate it. Currently, there are no mechanisms to access or include in search engines any "restricted" (i.e., requiring pre-authorization to access) links. In some scenarios, organization like IEEE, ACM, etc., may create public web pages with just abstracts or short descriptions or articles whereas the full article will be restricted. In these cases, additional web pages need to be maintained for each of the articles in their internal websites or databases which may require more resources and be cumbersome to maintain.

As such, it may be advantageous, among other things to provide restricted content publishing with search engine registry, whereby the restricted content may be restricted or unrestricted and requires pre-authorization for a user to access the content. The present embodiment may provide a way of discovering web links (which can include links to any type of data, restricted content, unrestricted content, content which may reside behind a corporate firewall, content that requires pre-authorization to access, etc.) where the source of the links is completely inaccessible to search engines (SE). The presence of the content (in the form of web links) being searched can be visible to the public domain or at targeted users so the method enables the SE to quickly list these links as part of the search results returned to the user. Benefits of the present embodiment may include the ability to discover these links quickly, avoiding the need to spend a considerable amount of time searching or viewing pages manually. Additionally, content owners may expose links to a SE without having to include it on their public sites. For example, premium or paid members may be able to locate content through a SE without content owners having to provide access or rich snippets to the SE.

According to at least one implementation, the present embodiment may provide a links registry (i.e., a content registry) which is accessible to content owners for contributing links relating to their domain and SEs to consume the information and return such information as part of search queries. Additionally, the content owners may be able to update the registry using an application program interface (API). The registry update may include the links and their relevant metadata using, for example, an XML/JSON post. Then the SEs may subscribe to the links registry to receive new content when it is updated in order for the information to be utilized in the SEs indexing or caching solutions without having to crawl the web pages as a result of the content possibly being restricted and access not existing for the SE. As such, when a search query is executed and relevant information exists in the registry based on tags, keywords, or metadata etc., the SE may return the relevant information as part of the result set allowing for quick discovery of the links.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to enable restricted content publishing with search engine registry.

According to at least one implementation, the present embodiment may allow a user to use a search engine, such as Google®, to access restricted information (i.e., restricted or unrestricted information that requires pre-authorization for a user to access it) within a private domain, such as a corporate domain after identifying the user as having appropriate permissions to access the restricted information. For example, an internal corporate article or presentation may be made available in both slide share (i.e., on the public domain) and on a corporate domain, (such as IBM's w3 internal corporate domain). However, the corporate domain version may contain additional restricted information. As such, the present embodiment may allow an authorized user of the restricted information to search for the content using an external search engine, such as Google® and using the links registry or metadata may identify the user searching for the content as an authorized user within the corporate domain and therefore, expose the restricted links within the corporate domain in the search results (possibly in a separate section) for user consumption.

Additionally, a corporation, such as IBM or Apple may share restricted content (behind a firewall) with business partners that have authorized access to the restricted content. For example, Apple may allow the restricted content to be searchable through a public search engine, such as Google®. As such, using the links registry or metadata, Google® may identify the user as an Apple employee searching for the content and as such, expose the restricted content in the search results for consumption by the user authorized user. Furthermore, only the link and associated metadata (may be a short description) are exposed. Therefore, the full content may still have restricted access. As such, by providing the link in the registry, the present embodiment is publishing the presence of a document or page, however, access to it is still restricted. For example, with respect to an Association for Computing Machinery (ACM) journal article, the link to the article may be exposed to conventional search engines, however, the access to article is limited to ACM members or other paid subscribers.

Furthermore, some journal articles, such as the Institute of Electrical and Electronics Engineers (IEEE) or the Association for Computing Machinery (ACM) are available only to their members or paid subscribers. Currently, such journal articles share the title, ISBN #, abstract, etc. in public websites for search engines to discover. However, rather than having to share such information, they may be able to provide "trusted link information" to Google®, for example, without maintaining public abstract pages. Also, based on the same concept, the present embodiment may allow airlines or retailers to provide special offers to exclusive club members, such as Platinum or Gold Club members.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Restricted Content Publishing with Search Engine Registry Program 116A. The networked computer environment 100 may also include a server 114 that is enabled to run a Restricted Content Publishing with Search Engine Registry Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Restricted Content Publishing with Search Engine Registry Program 116B running on server computer 114 via the communications network 110. The communications network 110 may include connections, such as wire, wireless communication links, or fiber optic cables. As will be discussed with reference to FIG. 5, server computer 114 may include internal components 502a and external components 504a, respectively, and client computer 102 may include internal components 502b and external components 504b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Restricted Content Publishing with Search Engine Registry Program 116A, 116B may interact with a database 112 that may be embedded in various storage devices, such as, but not limited to a mobile device 102, a networked server 114, or a cloud storage service.

As previously described, the client computer 102 may access the Restricted Content Publishing with Search Engine Registry Program 116B, running on server computer 114 via the communications network 110. For example, a user using a client computer 102 and a search engine, such as Google®, may be allowed to access restricted information within a corporate domain after being identified as having appropriate permissions to access the restricted information. For example (as previously described), an internal corporate article presentation may be made available in both slide share (i.e., on the public domain) and on a corporate domain. However, the corporate domain version may contain additional restricted information. As such, the Restricted Content Publishing with Search Engine Registry Program 116A, 116B may allow an authorized user of the restricted information to search for the content using an external search engine, such as Google® and using the links registry or metadata may identify the user searching for the content as an authorized user within the corporate domain and therefore, expose the restricted links within the corporate domain in the search results to the user. According to the present embodiment, only the link and metadata or short description may be exposed through the registry (enough for the SEs to index/tag for searching). The Restricted Content Publishing with Search Engine Registry method is explained in more detail below with respect to FIGS. 2-4.

Figure 2:
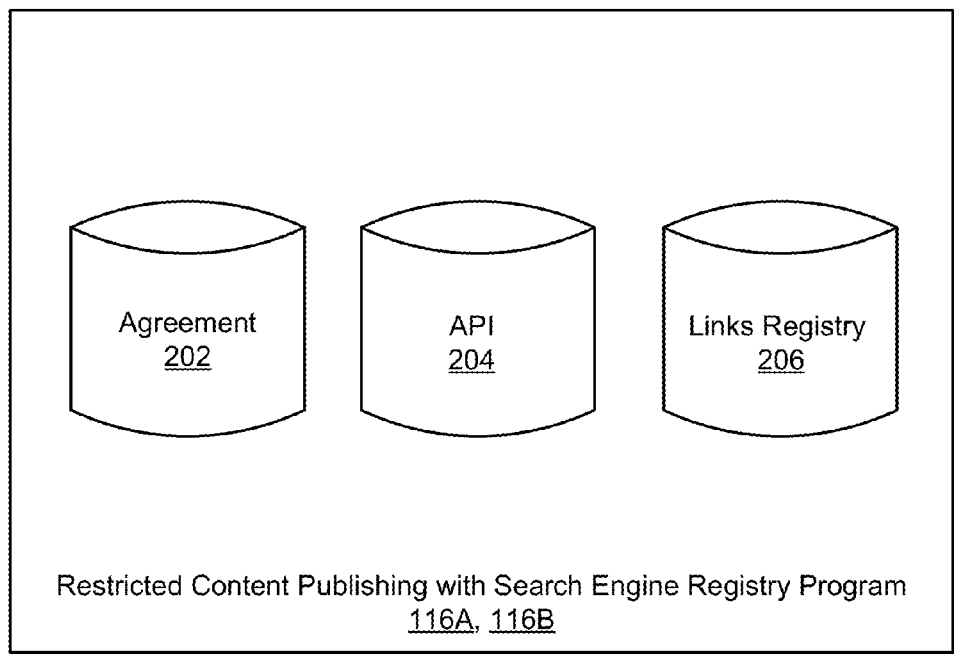
FIG. 2 is an exemplary illustration of the components associated with the Restricted Content Publishing with Search Engine Registry Program according to at least one embodiment.

Referring now to FIG. 2, an exemplary illustration 200 of the components associated with the Restricted Content Publishing with Search Engine Registry Program 116A, 116B in accordance with one embodiment is depicted. The Restricted Content Publishing with Search Engine Registry Program 116A, 116B may include an Agreement 202. The Agreement 202 is established between content providers, such as IBM and search providers, such as Google® or Yahoo® to ensure the content is from a trusted source. As such, the content owners may use an application program interface (API) 204 (i.e., a "plug in" to facilitate integration of new features into existing applications) to post new content in a different format to a Links Registry 206. According to at least one implementation, the Links Registry 206 registry may accept incoming requests, perform relevant validations, spam prevention, etc. and store the content in a database 112 (FIG. 1). The Links Registry 206 can be hosted by the SE or any other 3rd party provider. Additionally, the Links Registry 206 will notify or push new content to subscribing SEs when content has been posted.

Figure 3:
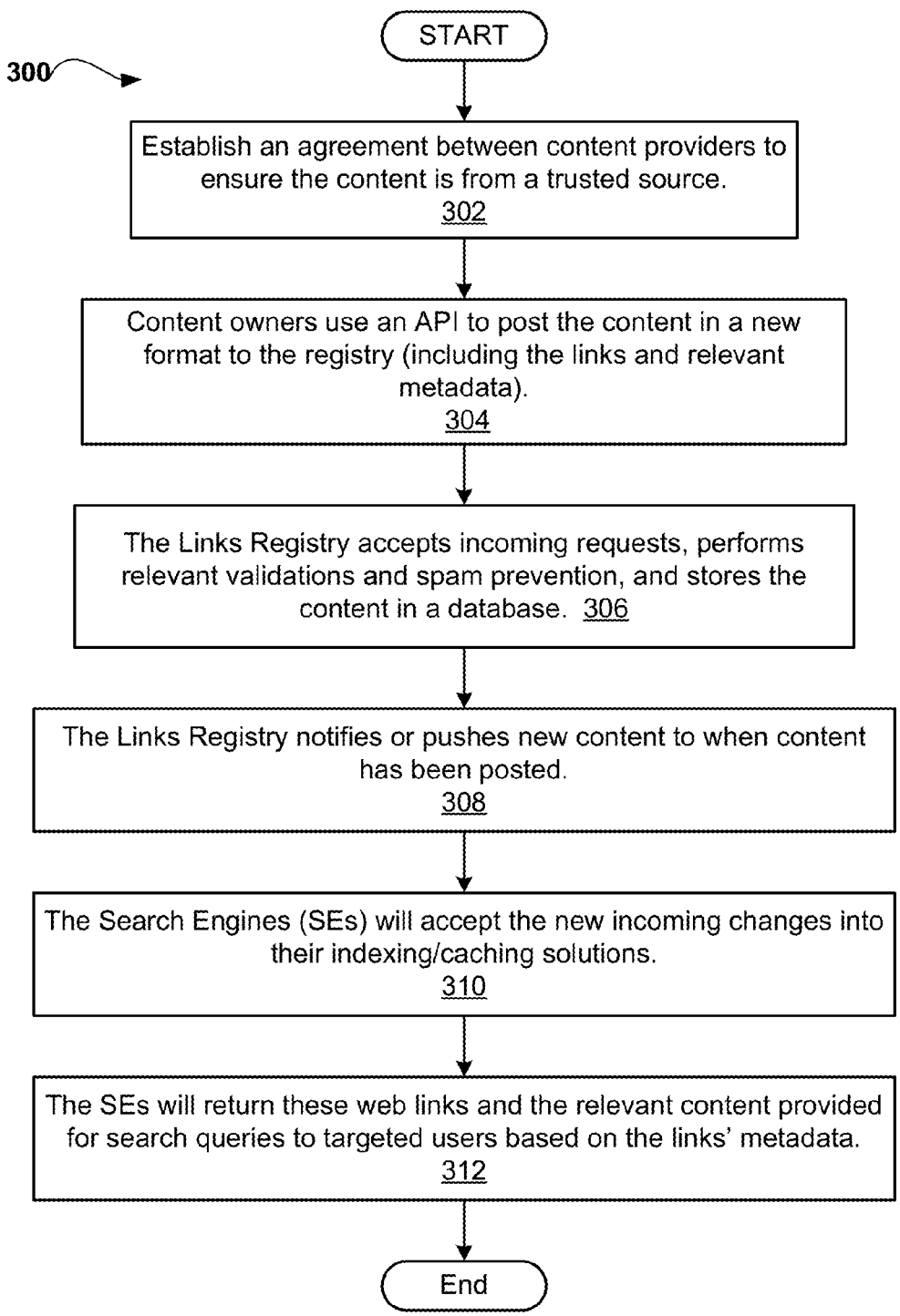
FIG. 3 is an operational flowchart illustrating the steps carried out by a program for restricted content publishing with search engine registry according to at least one embodiment.

Referring now to FIG. 3, an operational flowchart 300 illustrating the steps carried out by a program for restricted content publishing with search engine registry according to at least one embodiment is depicted. As previously described, the present embodiment may allow an authorized user of restricted or unrestricted information to search for the content using an external search engine. Then, using the Links Registry 206 (FIG. 2) or metadata, the Restricted Content Publishing with Search Engine Registry Program 116A, 116B (FIG. 1) may identify the user searching for the content as an authorized user within the corporate domain and therefore, expose the restricted links within the corporate domain in the search results to the user.

Therefore, with respect to FIG. 3, at 302 an agreement is established between content providers. For example, an agreement may be established between a content provider, such as IBM and search engines, such as Google® or Yahoo® to ensure the content is from a trusted source. According to at least one implementation, such an agreement may be a monetized service.

Next at 304, content owners will use an API to post a new content format to a registry which includes the links and relevant metadata. As such, content owners may use an API to post the content in a format such as Extensible Markup Language (XML) or JavaScript Object Notation (JSON) format to the Links Registry 206 (FIG. 2). The content format includes the links and relevant metadata associated with the content. XML is a markup language that defines a set of rules for encoding documents in a format which is both human-readable and machine-readable. JSON is an open standard format that uses human-readable text to transmit data objects consisting of attribute-value pairs. It is used primarily to transmit data between a server and web application, as an alternative to XML.

Then at 306, the Links Registry 206 (FIG. 2) will accept incoming requests, perform relevant validations, spam prevention, etc. and store the content in a database 112 (FIG. 1). According to at least one implementation, the Links Registry 206 (FIG. 2) can be hosted by the SE or any other 3rd party provider.

Next at 308, the Links Registry 206 (FIG. 2) will notify or push the new content to subscribing SEs when the content has been posted. Then at 310, the SEs will accept the new incoming changes into their indexing or caching solutions. As such, the SEs will not have to crawl pages since access now exists to the restricted content. Optionally, the contents of the registry may be fully open to the commercial SEs so that they can use this information for their internal indexing. As such, the present embodiment does not have to "push" or receive "notification" by the registry to SEs. The SEs can include the registry as part of their crawl/search/match.

Next at 312, the SEs will return these web links and relevant content provided for search queries to targeted users based on the links' metadata.

An example registry post in XML (JSON or anther format can also be used) may include the following:

1. The domain it should be associated with, when it should be published and if there is an expiration date for the entry.
2. Tags and Description can be used by the SE for index/caching purposes as well as all the other fields.
3. URL is the link needed to be injected into the search results which could be restricted links to content behind a corporate firewall, premium site, etc.
4. Netrange would be the targeted users/domain for which the links would be exposed in search results.
5. Results element can be used to optionally inject any other information with the link into the search results e.g. branding, etc.

An example registry post in XML may be illustrated as follows:

```xml
<?xml version="1.0" encoding="UTF-8" ?>
<register domain=" www.ibm.com " publish-on="2014-05-31"
expires-on= "2015-01-31" >
<post>
<tags>collaboration,blueflex</tags>
<url>https://w3.ibm.com/restricted/blueflex/index.html</url>
<netrange>192.168.0.0 - 192.168.255.255 </netrange>

<description>Information relating to the new release of
connections code name BlueFlex.</description>
<category>Software</category>
<author>IBM</author>
<feature><![CDATA[<h3>BlueFlex is here!</h3><img
src='http://www.ibm.com/public/blueflex.jpg' />]]></feature>

</post>
</register>
```

It may be appreciated that FIG. 3 provides only an illustration of one implementation and does not imply any limitations with regard to how different embodiments may be implemented. Many modifications to the depicted environments may be made based on design and implementation requirements. For example, content owners may optionally provide short description, tags or other relevant information to be used in the search and displaying as part of search results.

According to at least one implementation, the present embodiment may provide a way to register restricted content for search engine reporting which includes providing a content registry (i.e., a links registry) with interfaces, such as an application programming interface (API) to create, read, update, delete (i.e., CRUD or change) entries in the content registry whereby the entries include links and metadata for the restricted content. As previously explained, the present embodiment may provide access to the entries by a pre-authorized search engine (SE) to the content registry and may further validate entries input to the registry before storing the entries and return the entries to the pre-authorized search engine based on matching criteria selected from a group consisting of tags, keywords, and metadata.

The method may further include providing an interface for automatic notification of changes to the entries to the pre-authorized search engine to facilitate re-indexing or caching of the entries by the pre-authorized search engine using the latest content from the registry. The entries may be stored in the registry in an interchange format (for example, XML, JSON).

The pre-authorized search engine may be determined by an agreement (i.e., contract) between the restricted content providers and the search engine. Furthermore, the agreement may have rules for data exposure based on user criteria. Therefore, the restricted content and web links may be offered as part of the search results only to target search engine users specified by the agreement. As such, the targeted search engine users are identified through mechanisms selected from a group consisting of single sign on tokens (e.g. using openid or SAML), access control tokens (e.g. IEEE authentication token or partner authentication token), OAuth tokens (e.g. Google® OAuth tokens), and source network address (e.g., IBM intranet users may present source IP addresses for known public gateways belonging to IBM labs and specified in the agreement). The authorized user may be identified by the search engine (SE) through the use of a decentralized authentication and authorization protocols between the search engine (SE) and the restricted content provider acting on the links and metadata associated with the restricted content and according to terms and conditions included in the agreement between the restricted content provider and the search engine (SE).

Furthermore, some advantages of the present embodiment may include: restricted links and/or links to content that may exist behind a corporate firewall to be made searchable through a SE allowing for quick discovery; content owners may expose links to a SE without having to include these links on public sites in order for the links to be discovered through existing crawling/indexing algorithms or not having to provide additional public web pages by content owners; optionally, content owners may provide short description, tags or other relevant information to be used in the search and displaying as part of search results; and content owners may make these links visible (through the SE) for targeted users only (e.g., employees or business partners).

The present embodiment is focused on restricted content and allowing pre-authorized public search engines to utilize only the metadata associated with the content which is stored in the registry along with restricted URLs pointing to the actual content. Furthermore, the present embodiment enables the commercial search engines to search and report web pages which may be restricted to a subset of and audience, such as employees of a specific company. As such the existence and source location of the pages and documents may be reported to authorized users of such information, however, the access to the actual pages and documents themselves may not be provided. More specifically, the public search engine may not have access to the whole content but only to metadata associated with the content for indexing and tagging purposes. As such, the actual content may never be tagged or indexed. The public search engine is used to expose only restricted links to the actual content as part of search results. Additionally, the restricted URLs and metadata in the search result are exposed only to targeted users identified and access may be controlled using different mechanisms such as single sign on tokens (e.g., using openedID or SAML), access control tokens (e.g., IEEE authentication token or partner authentication tokens), OAuth tokens (e.g., Google OAuth tokens), and source network addresses (e.g., IBM Intranet users will present source IP addresses for known public gateways belonging to IBM labs and specified in the agreement). Furthermore, the present embodiment may target the public search engine and notify the pre authorized public search engine when results are changed or contributed to the registry by content owners.

Figure 4:
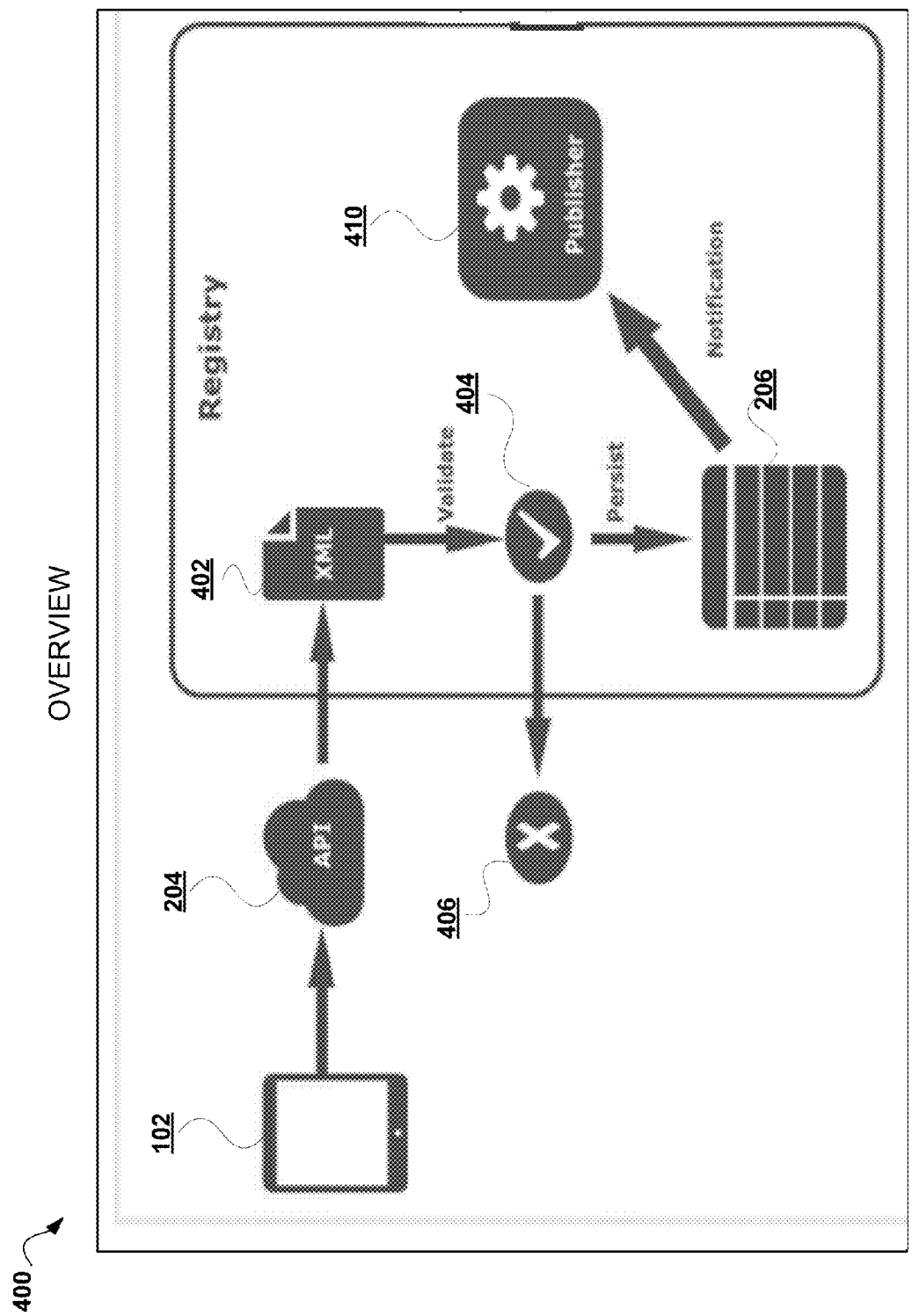
FIG. 4 is an exemplary illustration of an overview of the method steps described in FIG. 3 according to at least one embodiment.

Referring now to FIG. 4, an exemplary illustration 400 of an overview of the method steps described in FIG. 3 according to at least one embodiment is depicted. A user using a client computer 102 and a search engine, such as Google®, may be allowed to access restricted information within a corporate domain after being identified as having appropriate permissions 404 to access the restricted information. As such with respect to FIG. 4, content owners may use an API 204 to post a new content format, such as XML 402 to a registry 206 which includes the links and relevant metadata. As such, content owners may use an API to post the content in a format such as Extensible Markup Language (XML) 402 format to the Links Registry 206. As previously described, the Restricted Content Publishing with Search Engine Registry Program 116A, 116B (FIG. 1) may prevent 406 a user from accessing the restricted content information or allow 404 an authorized user of the restricted information to search for the content using an external search engine, such as Google® and using the links registry 206 and metadata may identify and validate 404 the user searching for the content as an authorized user 404 within the corporate domain and therefore, expose the restricted links within the corporate domain in the search results to the user. As such, the publisher 410 may publish the restricted content with search engine registry in the search results to the authorized user. Therefore, according to the present embodiment, the Restricted Content Publishing with Search Engine Registry Program 116A, 116B (FIG. 1) may register links to websites and as such, allow the contents of restricted information to be searchable and accessible by normal search engines to authorized users.

Figure 5:
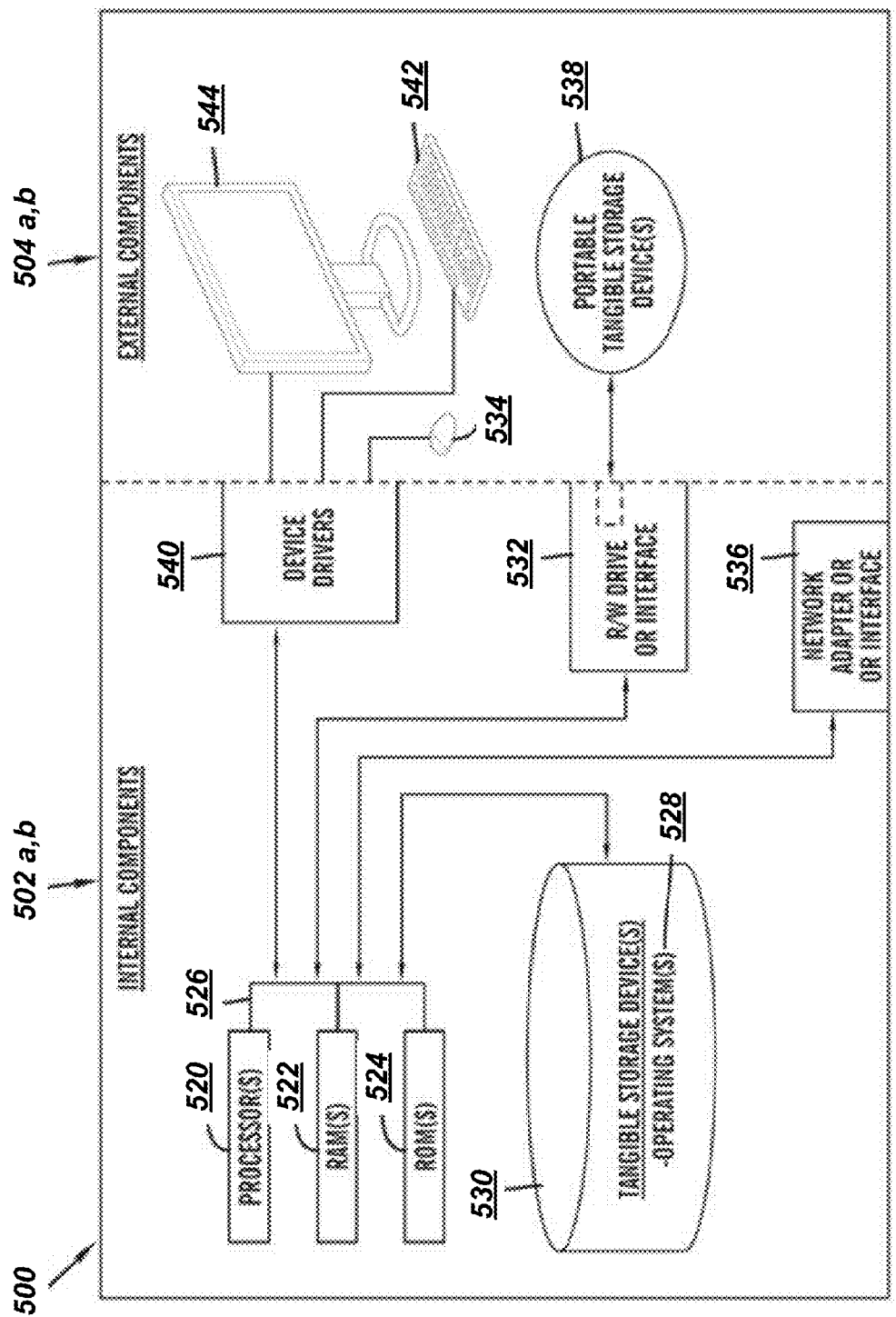
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 502a,b and external components 504a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528 and the Software Program 108 (FIG. 1) and the Restricted Content Publishing with Search Engine Registry Program 116A (FIG. 1) in client computer 102 (FIG. 1) and the Restricted Content Publishing with Search Engine Registry Program 116B (FIG. 1) in network server 114 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the Software Program 108 (FIG. 1) and the Restricted Content Publishing with Search Engine Registry Program 116A, 116B (FIG. 1) can be stored on one or more of the respective portable computer-readable tangible storage devices 538, read via the respective R/W drive or interface 532 and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The Software Program 108 (FIG. 1) and the Restricted Content Publishing with Search Engine Registry Program 116A (FIG. 1) in client computer 102 (FIG. 1) and the Restricted Content Publishing with Search Engine Registry Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 536. From the network adapters or interfaces 536, the Software Program 108 (FIG. 1) and the Restricted Content Publishing with Search Engine Registry Program 116A (FIG. 1) in client computer 102 (FIG. 1) and the Restricted Content Publishing with Search Engine Registry Program 116B (FIG. 1) in network server 114 (FIG. 1) are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542 and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
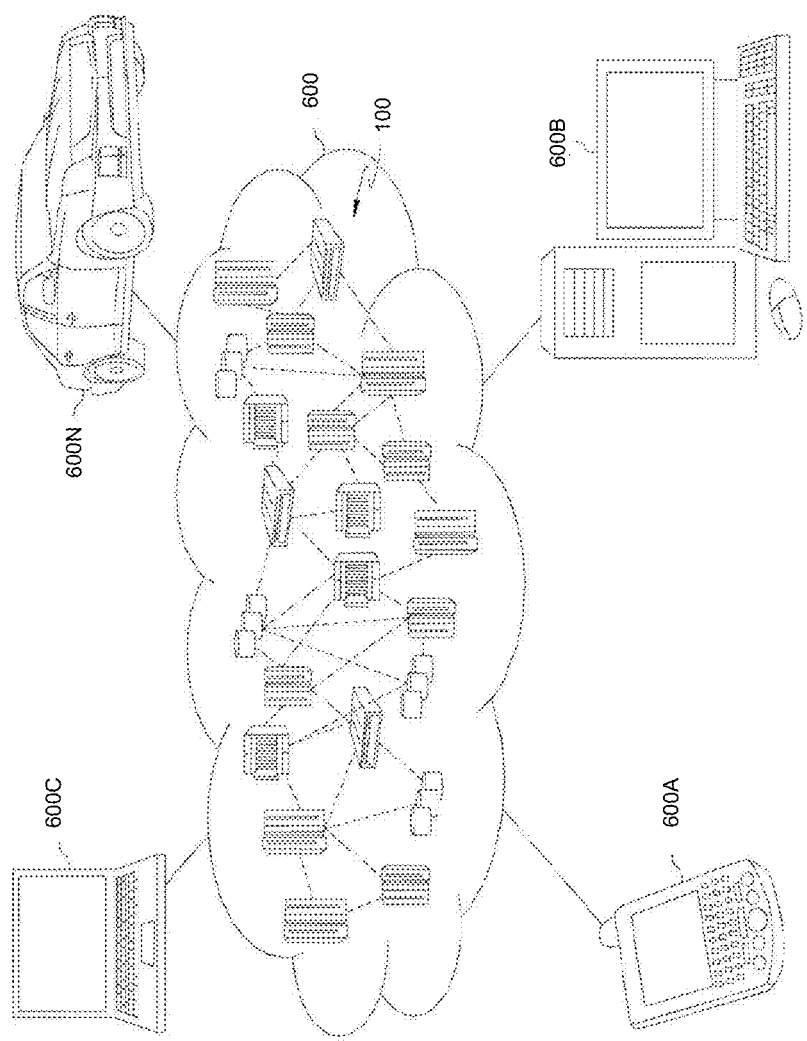
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
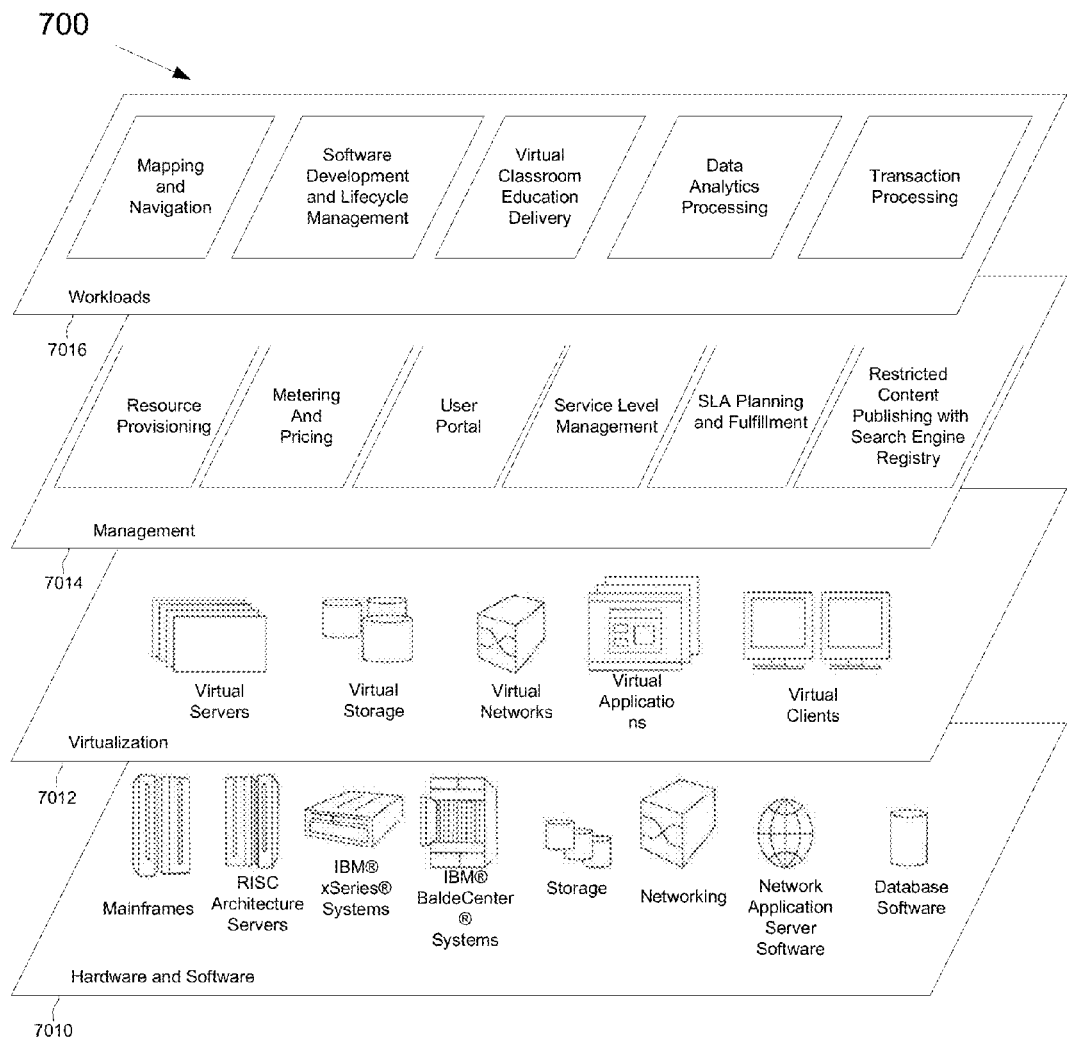
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Restricted Content Publishing with Search Engine Registry Program may allow an authorized user of the restricted information to search for the content using an external search engine and using the links registry or metadata may identify the user searching for the content as an authorized user within the corporate domain and therefore, expose the restricted links within the corporate domain in the search results to the user.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
providing, by a processor, an online content registry with at least one application program interface (API) to manage a plurality of online entries stored in the online content registry, wherein the API comprises:
storing online entries in the online content registry, wherein the online entries are stored in the online content registry in an interchange format, and wherein the stored online entries comprise:
metadata associated with online content restricted to access by an authorized requester, the metadata including a description of the online content; and
web links to the online content,
wherein:
the authorized requester is identified by the pre-authorized search engine through use of a decentralized authentication;
pushing the stored online entries to a plurality of indexing solutions associated with a pre-authorized external search engine, wherein the pushed online entries comprise access to the metadata and the web links, wherein the pre-authorized external search engine is determined by an agreement between a content provider and a search engine provider, and wherein the agreement between the content provided and the search engine provider comprises rules for data exposure based on requester criteria;
detecting at least one change associated with the pushed online entries; and
automatically sending to the pre-authorized external search engine a notification of the at least one change; and
providing, by the pre-authorized external search engine, access to the stored online entries to the online content registry responsive to:
an online search request received from the authorized requester; and
a set of relevant material stored in the online content registry matching the online search request,
wherein:
the matching is based on user data, tags, keywords, and the metadata associated with online entries stored within the online content registry;
providing access to the stored online entries comprises displaying, via a graphical user interface, the web links and the description of the online content; and
providing to the pre-authorized search engine an automatic notification of changes to an online entry within the online entries.

2. The method of claim 1, wherein the online entries are managed by using the at least one API to create, read, update, and delete at least one entry within the online entries.

3. The method of claim 1, wherein the authorized requester is identified by authorization protocols between the content provider and the search engine provider according to a terms and conditions included in the agreement.

4. The method of claim 1, wherein the API further comprises:
receiving the online entries; and
validating the received online entries.

5. A computer program product comprising a computer readable storage medium having stored thereon:
first program instructions programmed to provide, by a processor, an online content registry with at least one application program interface (API) to manage a plurality of online entries stored in the online content registry, wherein the API comprises:
storing online entries in the online content registry, wherein the online entries are stored in the online content registry in an interchange format, and wherein the stored online entries comprise:
metadata associated with online content restricted to access by an authorized requester, the metadata including a description of the online content; and
web links to the online content;
wherein:
the authorized requester is identified by the pre-authorized search engine through use of a decentralized authentication;
pushing the stored online entries to a plurality of indexing solutions associated with a pre-authorized external search engine, wherein the pushed online entries comprise access to the metadata and the web links, wherein the pre-authorized external search engine is determined by an agreement between a content provider and a search engine provider, and wherein the agreement between the content provided and the search engine provider comprises rules for data exposure based on requester criteria;
detecting at least one change associated with the pushed online entries; and
automatically sending to the pre-authorized external search engine a notification of the at least one change; and
second program instructions programmed to provide, by the pre-authorized external search engine, access to the stored online entries to the online content registry responsive to:
an online search request received from the authorized requester; and
a set of relevant material stored in the online content registry matching the online search request,
wherein:
the matching is based on user data, tags, keywords, and the metadata associated with online entries stored within the online content registry;
providing access to the stored online entries comprises displaying, via a graphical user interface, the web links and the description of the online content; and providing to the pre-authorized search engine an automatic notification of changes to an online entry within the online entries.

6. The computer program product of claim 5, wherein the online entries are managed by using the at least one API to create, read, update, and delete at least one entry within the online entries.

7. The computer program product of claim 5, wherein the authorized requester is identified by authorization protocols between the content provider and the search engine provider according to a terms and conditions included in the agreement.

8. A computer system comprising:
a processor set; and
a computer readable storage medium;
wherein:
the processor set is structured, located, connected, and/or programmed to run program instructions stored on the computer readable storage medium; and
the program instructions include:
first program instructions programmed to provide, by a processor, an online content registry with at least one application program interface (API) to manage a plurality of online entries stored in the online content registry, wherein the online entries are stored in the online content registry in an interchange format, and wherein the API comprises:
storing online entries in the online content registry, wherein the stored online entries comprise:
metadata associated with online content restricted to access by an authorized requester, the metadata including a description of the online content; and
web links to the online content;
wherein:
the authorized requester is identified by the pre-authorized search engine through use of a decentralized authentication;
pushing the stored online entries to a plurality of indexing solutions associated with a pre-authorized external search engine, wherein the pushed online entries comprise access to the metadata and the web links, wherein the pre-authorized external search engine is determined by an agreement between a content provider and a search engine provider, and wherein the agreement between the content provided and the search engine provider comprises rules for data exposure based on requester criteria;
detecting at least one change associated with the pushed online entries; and
automatically sending to the pre-authorized external search engine a notification of the at least one change; and
second program instructions programmed to provide, by the pre-authorized external search engine, access to the stored online entries to the online content registry responsive to:
an online search request received from the authorized requester; and
a set of relevant material stored in the online content registry matching the online search request,
wherein:
the matching is based on user data, tags, keywords, and the metadata associated with online entries stored within the online content registry;
providing access to the stored online entries comprises displaying, via a graphical user interface, the web links and the description of the online content; and
providing to the pre-authorized search engine an automatic notification of changes to an online entry within the online entries.

9. The computer system of claim 8, wherein the online entries are managed by using the at least one API to create, read, update, and delete at least one entry within the online entries.

10. The computer system of claim 8, wherein the authorized requester is identified by authorization protocols between the content provider and the search engine provider according to a terms and conditions included in the agreement.

11. The computer system of claim 8, wherein the API further comprises:
receiving the online entries; and
validating the received online entries.

* * * * *